P. & N. WHITNEY.
Grain-Binders.

No. 155,781.

Patented Oct. 6, 1874.

WITNESSES:

INVENTOR:
P. & N. Whitney
BY
ATTORNEYS.

P. & N. WHITNEY.
Grain-Binders.
No. 155,781.
3 Sheets--Sheet 2.
Patented Oct. 6, 1874.
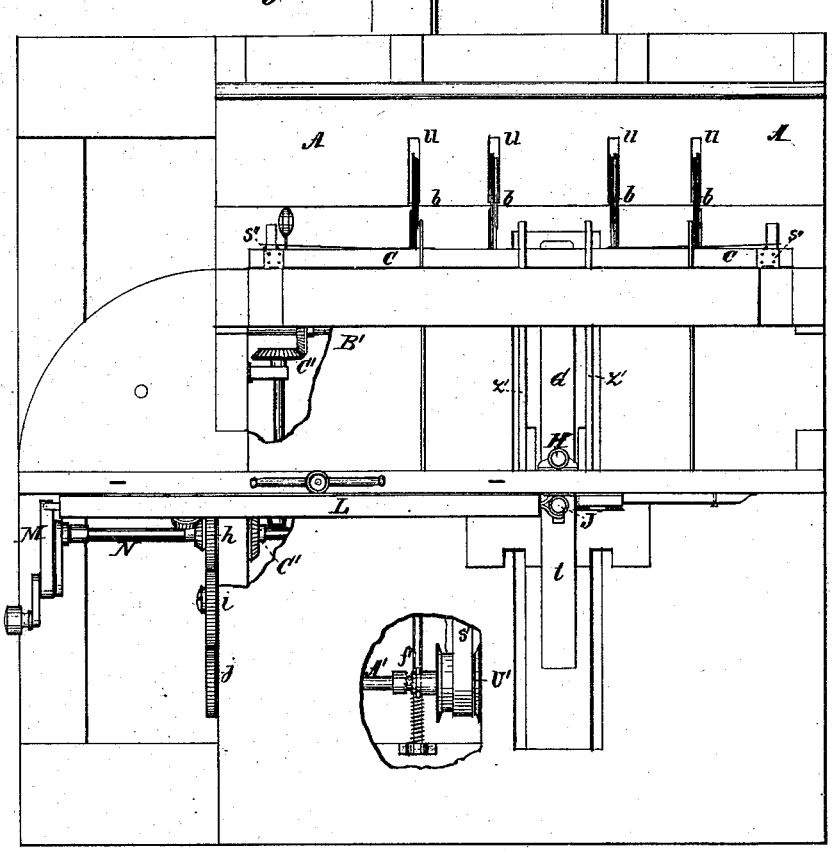
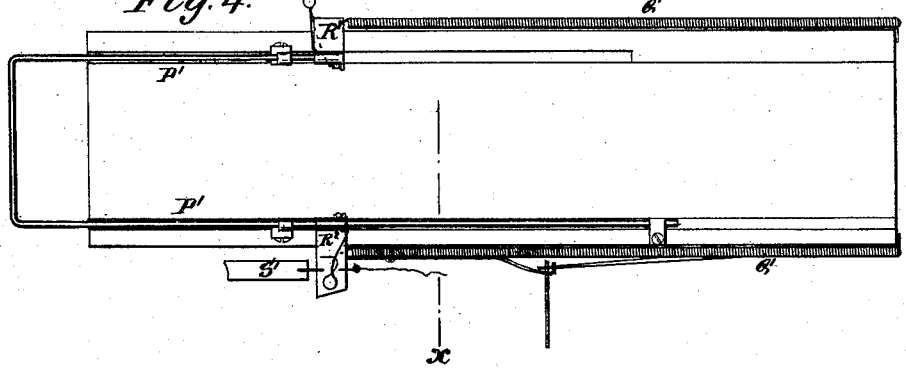
WITNESSES:
INVENTOR:
ATTORNEYS.

P. & N. WHITNEY.
Grain-Binders.
No. 155,781.
3 Sheets--Sheet 3.
Patented Oct. 6, 1874.
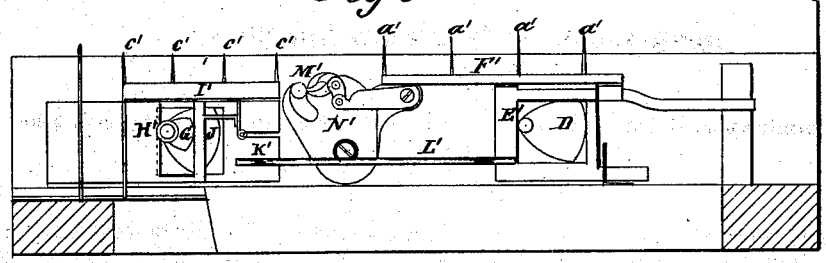
Fig. 5.
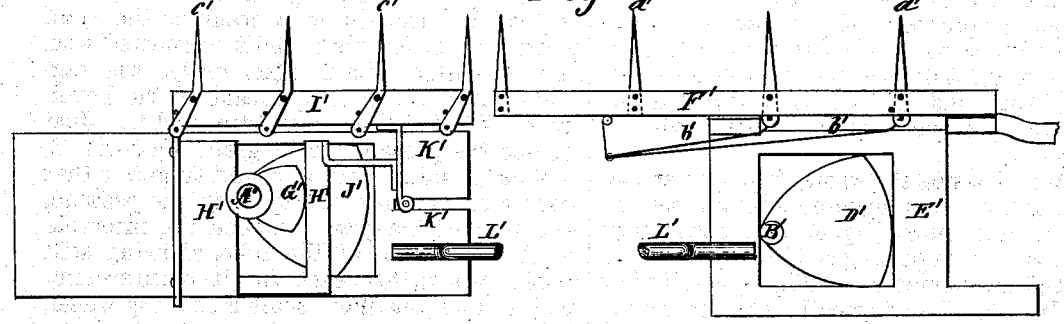
Fig. 6.
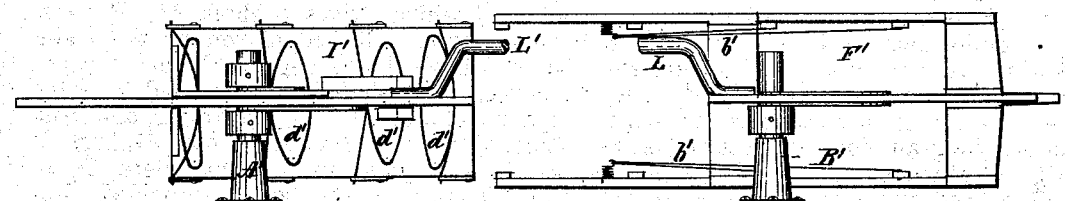
Fig. 7.
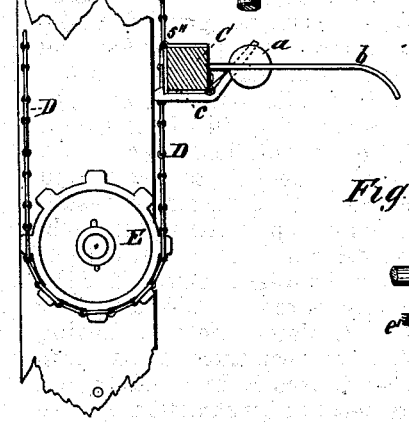
Fig. 8ᵃ
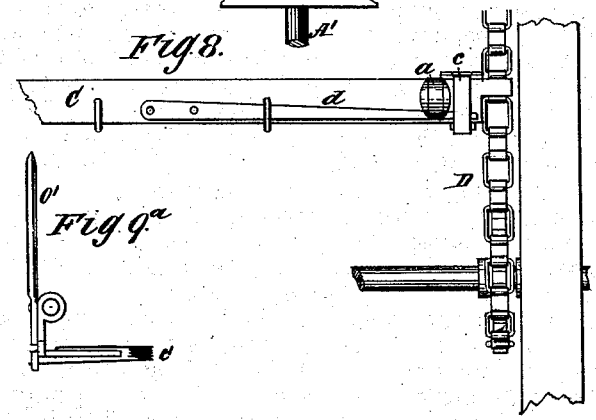
Fig. 8.
Fig. 9.   Fig. 9ᵃ
WITNESSES:
Colon C Kemon
C. A. Pettit
INVENTOR:
P. & N. Whitney
BY
ATTORNEYS.

UNITED STATES PATENT OFFICE.

PASCAL WHITNEY AND NEWEL WHITNEY, OF OSAGE, IOWA.

IMPROVEMENT IN GRAIN-BINDERS.

Specification forming part of Letters Patent No. 155,781, dated October 6, 1874; application filed July 2, 1874.

*To all whom it may concern:*

Be it known that we, PASCAL WHITNEY and NEWEL WHITNEY, of Osage, in the county of Mitchell and State of Iowa, have invented a new and Improved Grain-Binder; and we do hereby declare that the following is a full, clear, and exact description of the same, reference being had to the accompanying drawing, forming a part of this specification, in which—

Figure 1:
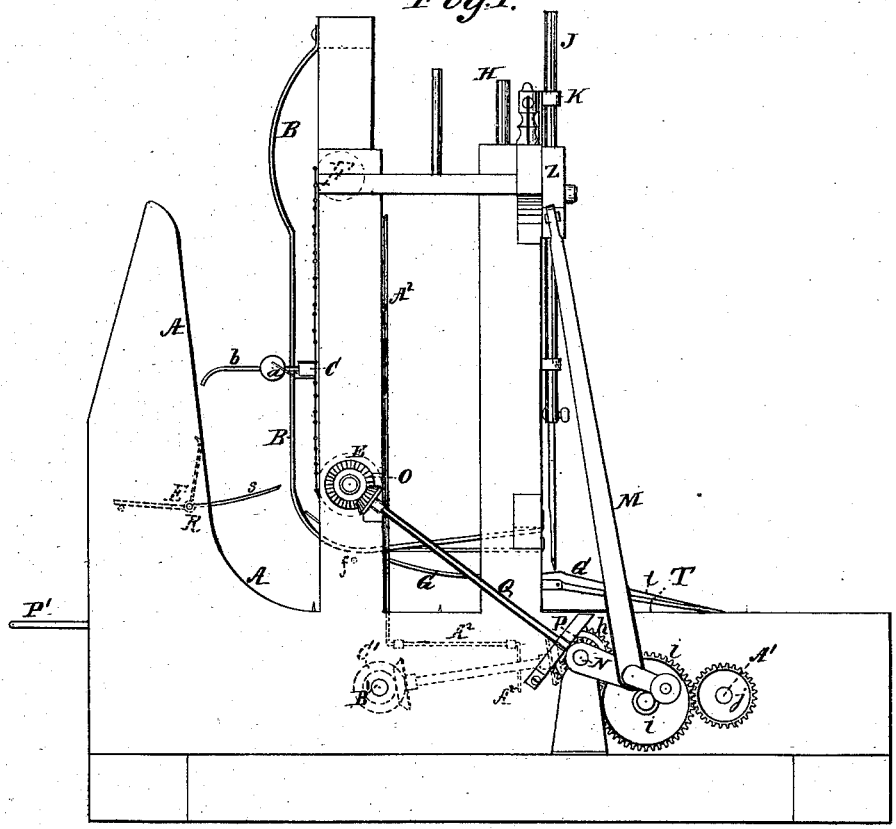
Figure 2:
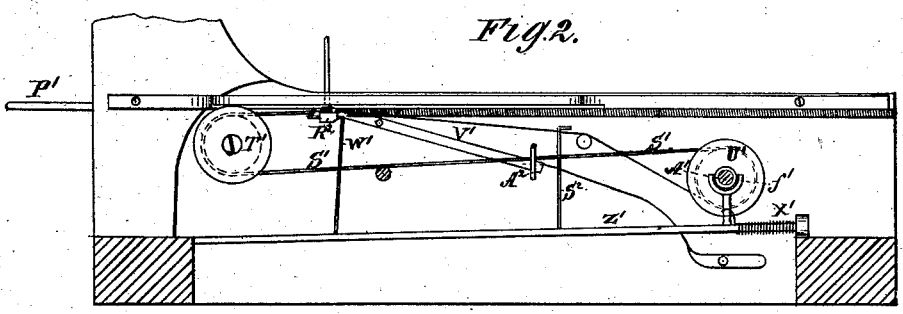

Figure 1 is a side elevation; Fig. 2, a vertical section of the bed of machine through line $x$ $x$; Fig. 3, a plan view; Fig. 4, underneath view of rods P' and appendages; Fig. 5, side view of feeds and connections; Fig. 6, detail view of feeds; Fig. 7, underneath view of same; Fig. 8, detail view of rake-head and appendage. Fig. 9 shows side and front view of follower-arms attached to rods P'.

This invention relates to that class of machines which are known as grain-binders, and is a new and improved arrangement, which may be attached to any harvester or reaper for binding the grain into sheaves as fast as it is cut. It consists in a curved passage for the grain formed by a slotted surface on one side and spring guide-bars on the other. Down this passage moves a rake attached to chains moving over rag-wheels, which gathers up a gavel of grain and presses it forward to a feed, which carries it under a presser-foot, where it is sewed through and through by a sewing-machine arrangement.

In the drawing, Figs. 1 and 3, A represents a plain metallic surface for forming one side of the curved passage for grain. B are the guide-bars for forming the other side of said passage, bent to suit the passage, and attached at their ends to the frame-work of the apparatus. C is the rake, Fig. 8, having teeth $b$ fastened by hinges $s'''$ to the chains D D passing around the rag-wheels E E and F F. Said rake C is provided at its ends with the counter-weights $a$, catches $c$, and springs $d$, which, with the pins $f$ attached to the upright parts, allow the rake to ascend with its teeth in a vertical position, and pointing downward. When it passes over the upper rag-wheels, however, the counter-weights $a$ cause it to latch again in a horizontal position and become rigid. G, Figs. 1 and 3, is a presser-foot attached to rod H, fastened in a support, and having a hinged piece, T, provided with a spring, $t$. J is a needle-bar sliding in supports K, and operated by the lever L and driving-rod M attached to a crank on the main shaft. N is the main shaft connected with the harvester. Said shaft drives the rag-wheels E E and F F by means of the bevel-gears O and P and connecting-rod Q. Just behind the passage for the grain is a shaft, R, having a spiral spring, $r$, and fingers $s$ that pass through slots $u$, Fig. 3, in the passage, and support the grain between the intervals of the revolution of the rake, allowing said rake to relieve them each time it comes around. Keyed upon the main shaft N is a cog-wheel, $h$, Fig. 1, which, through the transmitting cog-wheel $i$, communicates motion to a second cog-wheel, $j$, which drives a shaft, A'. B' is a shaft, parallel with A', driven by the main shaft through the bevel-gears C' and connecting-rod. Said shaft B' is journaled in bearings in the frame of the apparatus, and has attached to it a three-sided cam, D, Figs. 5 and 6, that plays in a square piece, E', to which is attached the feed F' provided with teeth $a'$, two of which on each side are articulated and held upright by springs $b'$. Said feed is intended to receive the gavel from the rake and press it under the presser-foot and needle. To shaft A' is attached two cams, shaped like D', the smaller one, G', moving in square piece H' attached to feed I', to give it a small lateral motion, and the larger one, J', moving in the sliding piece K', to give to said feed a long vertical motion, the motion resulting to the feed from the operation of this mechanism being the describing of a rectangle, of which the width is the lateral motion, and the length the vertical motion. Said feed I' is provided with articulated teeth $c'$ having springs, Fig. 7, $d'$, to keep them erect. The feed I' is attached to feed F' by a rod, L', and the object of its peculiar construction is to allow it the same vertical motion as F', but make it a slower feed. Upon the main shaft N, Fig. 5, is a crank, M', which operates a sewing-machine attachment, N', which, in combination with the needle, forms the stitch through the gavel. In addition to the feed F' for pushing forward the gavel, there are two articulated arms, O' O', Figs. 2 and 9, having springs e' to keep them erect. Said arms move in slots z' on each side of the feed F', Fig. 3, and are attached to rods P', Fig. 4, said rods having flanges R' and R'', to which are attached the spiral springs Q'. The object of these arms is to follow up the gavel and hold it tight when the teeth of the feed F' are below the table in the course of the revolution of the cam. To one of the flanges R'' is attached a belt, S', Figs. 2 and 4, which passes around a pulley, T', and is fastened to another pulley, U', held loosely upon shaft A'. Said pulley, however, has a clutch, f', Figs. 2 and 3, which couples with the shaft, thereby causing the pulleys to revolve and the belt S' to draw the flange R'', thereby bringing back the rods P' and arms O O', which, being articulated, fold forward when drawn back. The flange R'', as soon as far enough back, locks against the end of a lever, V', Fig. 2, held with a spring, and releases the coupling f' by striking against the arm W', which allows the spring X', upon rock-shaft Z', to hold the coupling apart. As soon as the rake-head passes around it strikes the bent lever A'', Fig. 1, which lifts the lever V', Fig. 2, releases the flange R'', and allows the arm O' to follow the gavel to the needle. As soon as the arms reach the needle, the flange R'' strikes a second arm, S'', attached to shaft Z', and effects the coupling of the pulley U' with the shaft A' again, and the former action repeated.

The operation of this machine is as follows: As the grain falls into the passage from the harvester it is kept straight by the spring-bars B, and held upon the fingers s until the rake comes around. The rake then takes it and forces it between the fingers s and the bars B, the fingers passing to one side by reason of the movable shaft, and delivers it upon the table S into the grasp of the feed F' and under the presser-foot. At this moment the extension of catches c strike the pieces f and throw the catches out from the hinges s'', allowing the rake-head to turn on its hinges, and ascend with its teeth pointing downward, by this means avoiding the tangling of the grain and otherwise discomposing the gavel. The gavel is then urged along under the presser-foot to and past the needle-bar by the feed F' and the arms O', where it is sewed into a sheaf with several sections, the arms O' and the piece T with spring t of presser-foot serving to hold the gavel tight and compact under the same while it is being sewed, the piece T also adapting the presser-foot to the different-sized gavels. After it is thus sewed it is pushed out by the feed I', which moves the gavel much slower than feed F', and consequently makes short stitches between the same. The sheaves are then separated by a knife, and, as there are a number of stitches between the sheaves, it has been found by experiment with a full-sized machine that the elasticity of the sheaves is sufficient when they are separated to so knot the severed ends as to form a secure and substantial binding.

Having thus described our invention, what we claim as new, is—

1. The slotted metallic surface A, the spring-bars B, and the fingers s for holding the grain delivered from the reaper, in combination with the rake C, as and for the purpose described.

2. The rake C, having catches c, counter-weights a and springs d, in combination with the chains D, hinges s'', and pins f, as and for the purpose specified.

3. The combination of the articulated arms O', the hinge-piece T of presser-foot, and the spring t, for the purpose of keeping the gavel compact while under the needle and preventing it from spreading, substantially as described.

4. The combination of the shaft B' with the cam D', the square piece E', teeth a', and spring b' for forming a feed, substantially as described.

5. The combination of the shaft A' with the two cams G' and J', the two independent square pieces H' and K', the articulated teeth c', and spring d', for the purpose of forming a feed symmetrical with F' in its vertical motion but of a smaller lateral motion, substantially as and for the purpose specified.

6. The combination of the rods P', flanges R' and R'', spiral springs Q', belt S', pulleys T' and U', clutch f', lever V', arm W', spring X', shaft Z', bent lever A'', and arm S'', for the purpose of operating the arms O', substantially as and for the purpose specified.

PASCAL WHITNEY.
NEWEL WHITNEY.

Witnesses to both signatures:
FRANK MINIGER,
A. D. LUTZ.